United States Patent [19]

Blakey et al.

[11] 3,723,927

[45] Mar. 27, 1973

[54] MAGNETIC HOLDING MEANS IN A SURFACE PLATE DIMENSIONAL MEASURING APPARATUS

[75] Inventors: Alexander G. Blakey; Jack S. Adams; James J. Swarts, all of San Diego, Calif.

[73] Assignee: General Dynamics Corporation, San Diego, Calif.

[22] Filed: Apr. 6, 1970

[21] Appl. No.: 25,713

Related U.S. Application Data

[63] Continuation-in-part of Ser. No. 821,587, May 5, 1969, abandoned.

[52] U.S. Cl. ............335/285, 33/DIG. 1, 33/174 TA
[51] Int. Cl. .................................................H01f 7/20
[58] Field of Search......335/302, 306, 285, 286, 293, 335/294, 295; 33/DIG. 1, 174 TA; 269/304, 305

[56] References Cited

UNITED STATES PATENTS 3,188,078   6/1965   Peterson ........................33/174 TA 2,510,634   6/1950   Hull...................................335/285
2,561,923   7/1951   Harmon .............................335/285
2,286,238   6/1942   Simmons............................335/306

OTHER PUBLICATIONS

"Walker Magnetic Chucks" pages 29-30.

*Primary Examiner*—George Harris
*Attorney*—Neil F. Martin

[57] ABSTRACT

The apparatus utilizes a surface plate with special inserts imbedded in its surface in a geometric pattern and associated fixtures and inspection tools for the purpose of dimensionally measuring specimen parts. The inserts are permanent or electromagnetic and have a recess in the exposed surface of the insert. The recess shape may be spherical, conical, or other geometric shapes. Fixtures and inspection tools have matching protuberances of the same geometric shape in a mating precision pattern under their bases, and are precisely located on the surface plate when the protuberances are aligned with the recesses in the magnetic inserts.

6 Claims, 3 Drawing Figures

Patented March 27, 1973

3,723,927

INVENTORS.
ALEXANDER G. BLAKEY
JACK S. ADAMS
JAMES J. SWARTS
BY *Neil F. Martin*
ATTORNEY.

MAGNETIC HOLDING MEANS IN A SURFACE PLATE DIMENSIONAL MEASURING APPARATUS

CROSS-REFERENCES TO RELATED APPLICATIONS

This is a continuation-in-part of application Ser. No. 821,587, filed May 5, 1969 and now abandoned.

BACKGROUND OF THE INVENTION

Surface plates are usually made from thick slabs of stone or other mineral materials which provide dimensional stability during temperature changes and other stresses on the slab. The top surface is a precision ground flat and smooth surface, or reference plane, used to dimensionally check machined, cast, forged, and formed parts. Early use of surface plates was limited essentially to height gage measurements from the surface plate to various points on the specimen part.

As parts became more complicated and as dimensional requirements became more stringent, special inspection tools and locating fixtures were developed that permitted the precision checking of parts for diameter, concentricity, contours, tangent point, parallelism, squareness, taper, depth of machining, and other measurements in a single setup. In order to accomplish these tasks the inspection tools used in dimensionally checking specimen part to blueprint requirements must be precisely located relative to the part and to the surface plate by various locating fixtures. These locating fixtures were made of heavy materials and were massive, because location was maintained solely by friction against the smooth plate surface. The mass of such fixtures was a serious limitation for inspection of small parts, and their weight was a handling problem for inspection personnel each time a new setup was made. Light weight fixtures utilizing magnetized bases required that the surface plate be constructed of a ferromagnetic material. Such materials when compared to granite or other stone materials have the disadvantages of being more dimensionally sensitive to temperature changes, easily scratched, and, of greatest concern, have a tendency to continually rust which in a short time destroys the precision ground flat surface.

Up to the present time, the most satisfactory solution to the problems described has been the utilization of granite and other stone-type plates with clearance holes or tapped holes in the plate and bolts to hold the fixtures firmly in place. With such an arrangement it is not possible to preset a precision setup such that the fixtures may be placed at various locations on the surface plate or on another surface plate and bolted down, without making many setup adjustments. This is because of the dimensional buildup caused by dimensional tolerances of the fixture hole diameter, bolt shank diameter, bolt thread dimensions and concentricity with bolt shank, the tapped hole or clearance hole in the table, and finally, one of the greatest contributers, the repeatability of the hole pattern across the entire surface plate as well as with other surface plates. Because of these dimensional build-ups few attempts at preset precision setups of fixtures have proved sucessful, unless the fixtures are located on the same plate at the same position each time the setup is made.

Employment of the hereinafter described system of recesses in the surface plate in combination with mating protuberances on the fixtures overcomes many of the objections to earlier methods by adequately holding parts with smaller fixtures that are preset and require no further adjustments each time the setup is made.

SUMMARY OF THE INVENTION

This invention is directed toward the use of recesses located in a precision pattern in the surface of a flat plate. These recesses are of a precision formed geometric shape, such as a cone, sphere, cylinder or other shape. Mating protuberances of a precision formed complementary geometric shape are attached to or part of the bases of locating fixtures and inspection tools, and are located in the same precision pattern as in the surface plate. Fixtures and inspection tools are precisely located when the protuberances are aligned with the mating recesses in the flat plate. Where a retention force is desired, the surface plate is equipped with magnetic means to provide magnetic attraction of the fixtures to the plate. Such magnetic means may be in proximity to the recesses or may incorporate the recesses into an exposed surface of the magnetic means. Threaded inserts located in the surface plate are utilized as attachment means for fixtures which require more reaction force than is provided by the magnetic means, but such attachment means need not be relied on to precisely locate the fixtures. Usually oversized clearance holes in the fixtures are utilized, so that the fixture is located by the protuberances aligning with the recesses, and bolts are then tightened.

It is therefore, an object of this invention to provide a means of accurately locating a specimen part relative to the fixtures for inspecting the specimen part.

Another object of the invention is to provide a surface plate inspection means in which one setup is adaptable to many inspection operations.

Another object of the invention is to provide a method of inspection that is sufficiently simple to permit lower skilled personnel to make the setup as well as conduct the dimensional inspection.

A further object of the invention is to locate recesses in such a uniform precision pattern that mating fixtures may be utilized to make a desired setup at any spot on the surface plate or on any other surface plate embodying the present invention without the need for further adjustments of the setup.

The invention has obvious advantages over the existing methods of inspecting since by its construction the points of location are accurately fixed and remain the same for repeated operations. Inspection operations can be changed in a minimum of time with relatively inexpensive and light weight fixtures. Use of the invention allows the plate to be employed on numerous tasks whereby greater utilization of the equipment is realized.

DESCRIPTION OF THE PREFERRED EMBODIMENT

Figure 1:
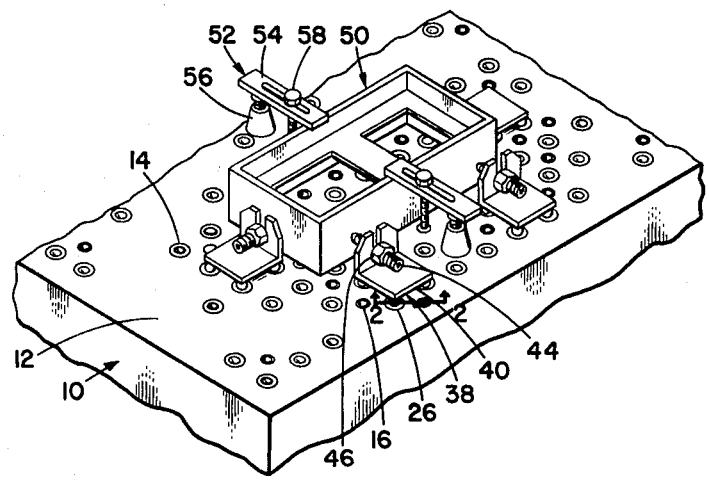
FIG. 1 is a perspective view of one form of the preferred embodiment of the invention.

Referring to FIG. 1, there is shown a granite mounting plate 10 having a planar surface 12. Surface 12 is provided with a multiplicity of bores 14 arranged in a predetermined geometric pattern. These bores may be arranged in triangular, square, hexagonal, or other patterns which are repeated with great precision over most of the plate surface. Additionally planar surface 12 of mounting plate 10 is provided with a plurality of smaller bores 16 interspersed between the larger bores 14.

Figure 3:
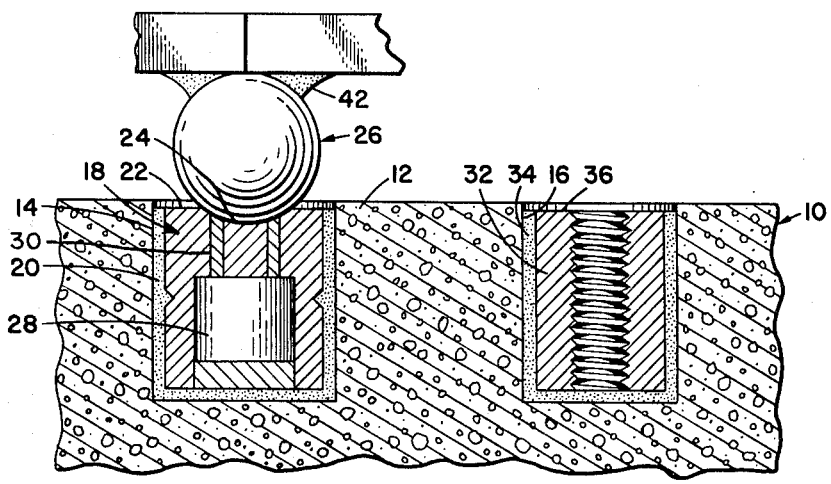
FIG. 3 is an enlarged cross-sectional view taken along line 2—2 of FIG. 1.

FIG. 3 shows a typical cross-sectional view through bores 14 and 16 of mounting plate 10. Positioned within each bore 14 is a magnetic insert 18. Bore 14 is larger than the magnetic insert 18 to allow the use of a positioning means 20 for positioning and maintaining the magnetic insert 18 in an accurate location. The positioning means is preferably an adhesive material, such as epoxy resin which facilitates the precision locating of the magnet means by permitting fine adjustments in the magnet's location prior to the hardening of the adhesive. The positioning means 20 may not be required in surface plates made from material which permits machining bore 14 in the required precise location, or where the recess 24 is machined in the magnetic insert in the desired precise location after the insert has been installed in plate 10, or obviously where the recess is machined directly into the surface 12 without the use of a magnetic insert.

The magnetic insert is also located such that its upper surface 22 is lower than the planar surface 12 of mounting plate 10. Surface 22 of the magnetic insert is provided with a spherical recess 24 to accept a ball 26 made of a ferromagnetic material. Magnetic insert 18 contains a permanent magnet 28 and a nonmagnetic spacer 30 to set up a sufficient magnetic field to hold ball 26 in the spherical recess 24.

Also shown in FIG. 3 is a typical cross-sectional view through bore 16 and threaded insert 32. Bore 16 is larger than the threaded insert 32 if a positioning means 34 is utilized to position and maintain the threaded insert 32 in an accurate location. Threaded insert 32 is also located such that its upper surface 36 is lower than the planar surface 12 of mounting plate 10.

A plurality of positioning fixtures 38 are shown in FIG. 1. Positioning fixture 38 is comprised of a fixture body 40 that is supported by balls 26, made of steel or other ferromagnetic material, that are affixed to the fixture body 40 by adhesive material 42 (shown in FIG. 3). An adjustable pin 44 is locked into the checking position by means of lock nuts 46. A specimen part 50 may be clamped into place by means of a retaining clamp assembly 52 comprising a clamp 54 supported by a jack 56 held into place by a bolt 58 threaded into the insert 32.

Figure 2:
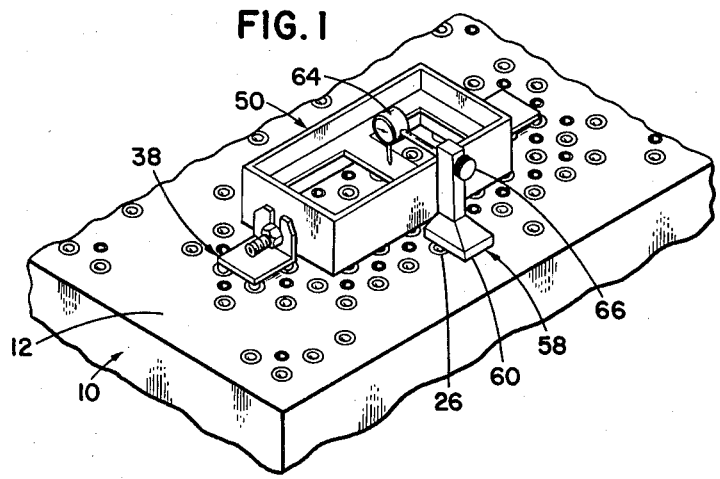
FIG. 2 is a perspective view of another form of the preferred embodiment of the invention in an inspection operation.

FIG. 2 illustrates an embodiment for inspecting the thickness or height dimension of specimen part 50. A plurality of positioning fixtures 38 may be employed to locate and hold part 50 in place during this operation. The dimensional inspecting utilizes a gauge assembly 58 composed of a gauge body 60 supported on a plurality of steel balls 26 affixed to gauge body 60 by a suitable adhesive material. A gauge 64 is attached to gauge body 60 and positioned by gauge adjustment control 66.

To fabricate the necessary fixtures for inspecting a specimen part 50, fixture bodies 40 of a size appropriate for part 50 are selected. Steel balls 26 of sufficient quantity are then inserted in recess 24 of magnet means 18 under a fixture body 40. Adhesive material is then applied between steel balls 26 and fixture body 40 and permitted to cure. A suitable master part gauge is placed on the planar surface 12 of mounting plate 10 in the location where the part 50 is to be inspected. Positioning fixtures 38 are thereafter positioned at the points to be inspected and/or restrained. Adjustable pin 44 is then mounted on fixture body 40 and locked into position by use of lock nuts 46. Adjustable pin 44 can be final-set to a position a predetermined distance away from the master part gauge by inserting a suitable spacer material of a known thickness between the end of adjustable pin 44 and the master part gauge during the final adjustment. Positioning fixtures 38 can be removed from mounting plate 10 by overcoming the magnetic force applied to steel balls 26 of each positioning fixture 38. The master part gauge can then be removed from mounting plate 10 and specimen part 50 positioned on the mounting plate 10 in position for inspecting. The steel balls 26 of positioning fixtures 38 are then repositioned into the recesses 24 of magnetic insert 18 from which they were removed, and inspection of part 50 is accomplished. Positioning fixtures 38 may be removed and repositioned for each succeeding inspection of other specimen parts.

Where part 50 is likely to move during the test operation, retaining clamp assembly 52 can be installed by positioning a jack 56 under a clamp 54 and inserting a bolt 58 through the clamp 54 and threadedly engaging it into threaded insert 32.

The use of a gauge assembly 58 is accomplished by selecting a suitable gauge body 60. A plurality of steel balls 26 are inserted in recess 24 of magnet means 18 under the gauge body 60. Adhesive material is applied between steel balls 26 and gauge body 60 and permitted to cure. Upon completion of curing of adhesive material, gauge 64 is placed in the location it will be employed, and adjusted to the desired position by means of gauge adjustment control 66. The gauge assembly 58 is then ready for use and may be removed from mounting plate 10 by overcoming the magnetic force applied to steel balls 26 of the gauge assembly 58. Gauge assembly 58 may be removed and repositioned for each succeeding inspection of other specimen parts by reinserting steel balls 26 of gauge assembly 58 into the same recess 24 of magnetic insert 18.

From the foregoing description of the operation of the improved surface plate invention it can be seen that an extremely flexible inspection technique has been provided. The same surface table can be utilized for multiple inspection of different parts since the initial setup time for any given test is facilitated by the simple construction of inspection and locating fixtures. The re-setup time has been greatly reduced through the use of the magnetic inserts and balls of the present invention.

Additionally, since the magnets are precision located in a geometric pattern, inspection of parts, for which tooling has been previously manufactured, can be accomplished on any surface plate embodying the principles of the invention and utilizing the same hole spacing and geometric pattern. The use of a spherical recess provides a self-centering aspect and makes the precise positioning of the fixtures repeatable from one use to the next. Tolerances as close as 0.0001 of an inch between recess centers have been held from one end of the plate to the other.

Obviously, many modifications and variations of the present invention are possible in the light of the above teachings and the invention may be practiced otherwise than as specifically described. As an example, where checking of a radius is required a bar having a single ball resting in a recess could be swung utilizing the recess position as the precise center of the arc. It therefore should be understood that the particular embodiments shown in the drawings and described above are illustrative only and are not intended to limit the scope of the invention.

We claim:

1. In dimensional measuring apparatus which comprises a surface plate, a plurality of holding and measuring fixtures adapted to be located at selected positions on the surface plate, and means to releasably hold the fixtures at selected positions, the improvement wherein:

said releasable holding means comprises a plurality of magnetic inserts located in said surface plate, each of said magnetic inserts having a recessed upper face, and said fixtures each having at least one protuberance seated in said magnetic insert recessed upper face.

2. The dimensional measuring apparatus of claim 1 wherein said magnetic inserts have a spherical recessed upper face.

3. A fixture supporting surface plate comprising: a plate having a substantially smooth surface, and a plurality of magnetic inserts located within said surface plate in a repeating geometric pattern, each of said magnetic inserts having a recess contoured upper face located to be accessible through the smooth surface of said plate.

4. The fixture supporting surface plate of claim 3 wherein said magnetic inserts are located so that each of said recess contoured upper faces are respectively coplanar with a plane parallel to and below said smooth surface of said plate.

5. In a dimensional measuring apparatus comprising a surface plate and a plurality of holding and measuring fixtures adapted to be located at selected positions on the surface plate, an improved means to releasably hold the fixtures at selected positions comprising:

a surface plate having a plurality of vertical bores located in a repeating geometric pattern in the top surface of said surface plate;

a magnetic insert located in each of said bores, said insert having a top face formed to define a shallow spherically concave seat, said seat located entirely below said top surface of said surface plate; and a plurality of ferromagnetic balls attached to the bottom face of said fixtures, said balls being spaced apart on each fixture the same distance and in a conforming geometric pattern as said concave seats and seated in mating concave seats of said magnetic inserts.

6. The dimensional measuring apparatus of claim 5 wherein said magnetic inserts are positioned in said bores so that said concave seats are coplanar with a reference plane parallel to and below the surface of said surface plate, and wherein said ferromagnetic balls are positioned to locate said fixtures at a predetermined orientation and distance from said reference plane.

* * * * *